US006820272B2

United States Patent
Wang

(12) United States Patent
(10) Patent No.: US 6,820,272 B2
(45) Date of Patent: Nov. 16, 2004

(54) STOPPER STRUCTURE FOR ROTATION DISC HOUSING

(75) Inventor: Kuo-Jen Wang, Chung Li (TW)

(73) Assignee: Benq Corporation, Taoyuan (TW)

( * ) Notice: Subject to any disclaimer, the term of this patent is extended or adjusted under 35 U.S.C. 154(b) by 177 days.

(21) Appl. No.: 10/335,901

(22) Filed: Jan. 3, 2003

(65) Prior Publication Data

US 2004/0205800 A1 Oct. 14, 2004

(30) Foreign Application Priority Data

Dec. 24, 2002 (TW) .................................... 91200686 U

(51) Int. Cl.⁷ ..................... G11B 17/03; G11B 33/02
(52) U.S. Cl. ..................... 720/600; 369/77.11
(58) Field of Search ................... 720/600; 369/270, 369/77.1, 77.2, 75.1, 75.2, 178; 360/133, 132

(56) References Cited

U.S. PATENT DOCUMENTS

| 5,793,729 | A | * | 8/1998 | Soga et al. ............. 369/75.1 |
| 6,134,205 | A | * | 10/2000 | Watanabe ............. 369/77.1 |
| 6,414,928 | B1 | * | 7/2002 | Aoki et al. ............. 369/77.1 |
| 6,728,201 | B2 | * | 4/2004 | Takizawa et al. ....... 369/291 |
| 6,731,583 | B2 | * | 5/2004 | Kabasawa ............. 369/77.1 |

* cited by examiner

*Primary Examiner*—Allen Cao
(74) *Attorney, Agent, or Firm*—Troxell Law Office PLLC

(57) ABSTRACT

A stopper structure is constructed at a lateral side of an upper cover of a disc drive housing to prevent a flying-away disc from leaving the housing. The stopper structure with a predetermined inward-angle tip can generate a lift to drive the disc away from an aperture located between the upper cover and a base tray while hitting the lateral side. Thereby, the straying disc can thus be self-locked inside the housing.

3 Claims, 3 Drawing Sheets

STOPPER STRUCTURE FOR ROTATION DISC HOUSING

BACKGROUND OF THE PRESENT INVENTION (1) Field of the Present Invention

The present invention relates to a stopper structure for a disc drive housing and more particularly to a structure that has an upper cover with a lateral side formed with an inward angle to restrict the disk within the drive housing when there is rotating disc or its broken fragment tend to flying out.

(2) Description of the Prior Art

In computer and media technology, optical disk or the like disk is an excellent medium and data storage means. Data recording and retrieval are generally done by means of a Compact Disk Drive. In the art, a compact disk drive mainly consists of two major parts; one is a data retrieval mechanism which further includes apparatus for supporting the disk and for reading and retrieving data from the disk, and the other one is a control circuitry. The disc drive housing of the present invention relates to the housing of the compact disk drive.

Referring to FIG. 1 for a conventional rotating disc housing of the data retrieval mechanism for a compact disk drive, it consists of a base tray 10, an upper cover 11, a rotating disc 14 and a clamping mechanism 13. A disk 14 operates in an accommodation space formed between the base tray 10 and the upper cover 11. The upper cover 11 functions as a protective lid for the accommodation space and has a lateral side 15 formed as a slanted-seal edge. During operations, the disk 14 is mounted on the turntable 12 inside the base tray 10 and is driven by a driving motor 35. The clamping mechanism 13 is used to anchor the disk 14 on the rotation disc 12.

When the drive is operating, the disk 14 is spinning to perform data retrieval or writing function. Upon an event of unexpected external impact or failure of the clamping mechanism 13, the disk 14 may fly away sideward from the turntable 12 due to clamping defect and rotation inertia, and hit the lateral side 15 of the upper cover 11.

Refer to FIG. 2. When the rotating disk 14 flies away from the turntable 12, it may hit the lateral side 15 of the rotation disc housing with a great impact. Although the disc drive housing serves as a protective cover device, yet the lateral sides of the upper cover 11 and the base tray 10 are still elastic and can be treated as individual cantilevers. The lateral side 15 of the upper cover 11 could be bent upward by the flying disk 14, while the base tray 10 is pushed to bend downward, and an aperture 36 is suddenly formed between the upper cover 11 and the base tray 10. It could result in the disk 14 to be flying out of the aperture 36. In such circumstances, the disk 14 is highly possible to severely harm the user. To prevent the accidents and possible damages mentioned above, an improvement upon the construction of the disc drive housing is needed.

SUMMARY OF THE PRESENT INVENTION

Accordingly, the primary object of the present invention is to provide a stopper structure for the disc drive housing. In the present invention, the upper cover of the disc drive housing has a lateral side characterized by an inward-angle bent shape. When a disk flies incidentally away and hits the lateral side of the upper cover, the impact force can positively distribute to deform the lateral side toward a direction of closing the aperture between the upper cover and the base tray. Hence, the disk can be retained inside the disc drive housing. As a result, harm to end users can be reduced greatly.

The disc drive housing of the present invention includes a base tray for supporting the disk, and an upper cover for protecting and covering the base tray. The base tray and the upper cover together form an internal accommodation space for the disk. In the accommodation space, a turntable for holding the disk and a clamping mechanism for anchoring the disk on the rotation disc are constructed. Below the base tray, a driving motor is included for driving the turntable as well as the disk mounting on the rotation disc. In the disc drive housing, the aperture is formed between the base tray and the upper cover to allow the disk to move in or out of the disc drive housing. The stopper structure of the present invention is located on a lateral side of the upper cover adjacent to the aperture. The lateral side has a predetermined inward-angle tip (inclining towards the center of the disc drive housing). When the disk in the disc drive housing flies outwards and hits the lateral edge, the inward-angle tip can split the impact force into beneficial force components. As a result, the disk can be tilted upwards and moves away from the aperture, or the aperture becomes narrower while the disk hits. Thereby, the disk can be retained in the disc drive housing.

In the present invention, the predetermined inward-angle tip of the stopper may be at any acute angle, but preferably an angle between 5 and 30 degrees.

In an embodiment of the present invention, the lateral side of the stopper structure may further include an end formed a flange jutting inwards for a selected length. The jutting flange is extended in a direction away from the base tray and extended towards the center of the rotation disc housing.

The foregoing, as well as additional objects, features and advantages of the present invention will be more readily apparent from the following detailed description, which proceeds with reference to the accompanying drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
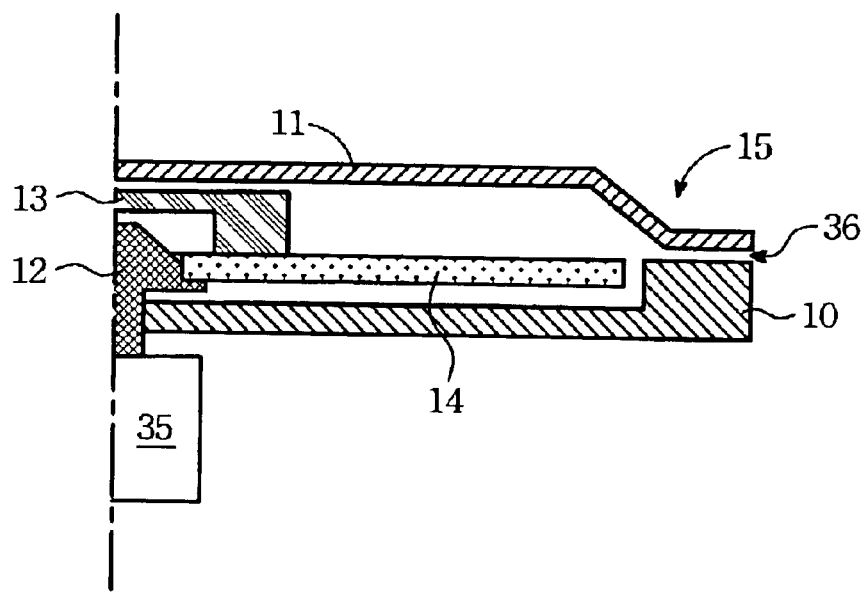
FIG. 1 is a fragmentary schematic view of a conventional rotation disc housing device.

The present invention disclosed herein is directed to a stopper structure for the rotation disc housing. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

In order to maintain consistency in this descriptions, elements with same or similar function but slightly differences in forms will be marked by same names and numerals in the drawings.

Figure 2:
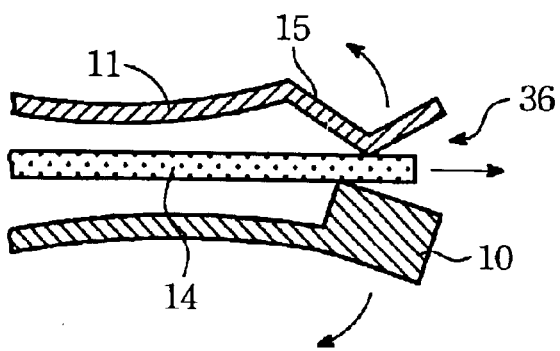
FIG. 2 is a fragmentary schematic view of a rotating disk flying away from the rotation disc housing.

The present invention aims to provide an improved rotation disc housing. As previously discussed (referring to FIGS. 1 and 2), a rotation disc housing generally consists of a base tray 10 and an upper cover 11 for protecting and covering the base tray 10. The base tray 10 and the upper cover 11 together form an internal accommodation space to house a disk 14. In the accommodation space, a turntable 12 for supporting the disk 14 and a clamping mechanism 13 for anchoring the disk 14 on the turntable 12 are constructed. Below the base tray 10, a driving motor 35 for driving the turntable 12 as well as the disk 14 located thereon is located. In the rotation disc housing, the driving motor 35 drives the turntable 12 and disk 14 to rotate between the base tray 10 and upper cover 11. The base tray 10 and upper cover 11 further form an aperture 36 therebetween to allow the disk 14 moving in or out of the rotation disc housing.

Figure 3:
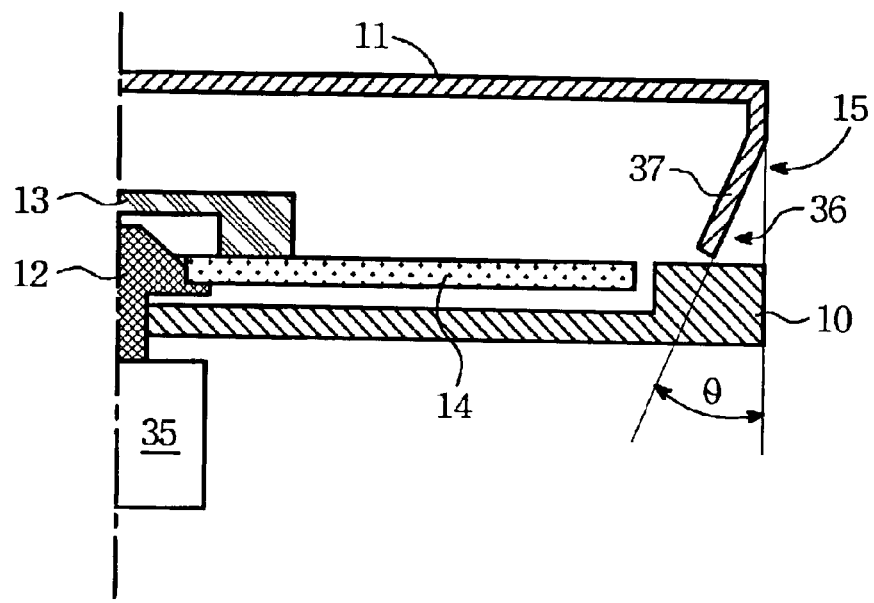
FIG. 3 is a fragmentary schematic view of an embodiment of a stopper structure of the present invention.

Referring now to FIG. 3 for an embodiment of the present invention, the stopper structure 37 according to the present invention is constructed at the lateral side 15 of the upper cover 11 adjacent to the aperture 36. The lateral side 15 is extended downwards and inwards at a predetermined inward angle θ (inclining towards the center of the rotation disc housing). In the present invention, the predetermined inward angle θ for the stopper structure 37 may be any proper acute angle. However, considering space limitations, the inward angle θ is preferably ranged between 5 and 30 degrees.

Figure 4:
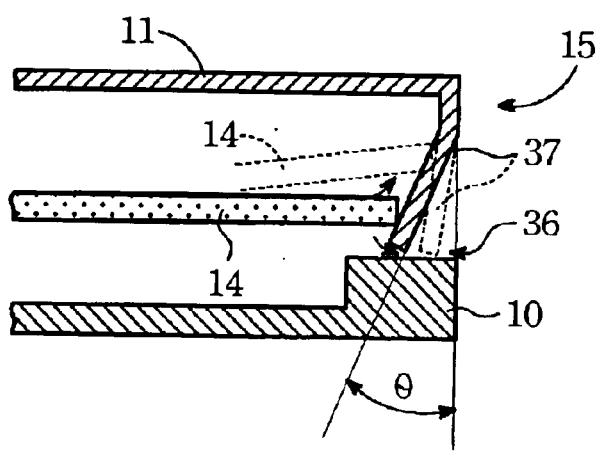
FIG. 4 is a fragmentary schematic view of the present invention, with the stopper structure hit laterally by a disk.

Referring now to FIG. 4, when the present invention is applied and in the case that the disk 14 hits the lateral side 15 (i.e. the stopper structure 37) due to an accidental or unpredictable reason, the inward angle θ of the lateral side 15 can contribute to split and distribute the impact force to channel the disk 14 upwards. Thereby, the moving direction of the disk 14 can be tilted upwards and thus away from the aperture 36. In the mean time, for the lateral side 15 is deformed by the impact force of the disk 14 to narrow the aperture 36, the disk 14 can then be prevented from slipping out and thus remained inside the rotation disc housing.

Figure 5:
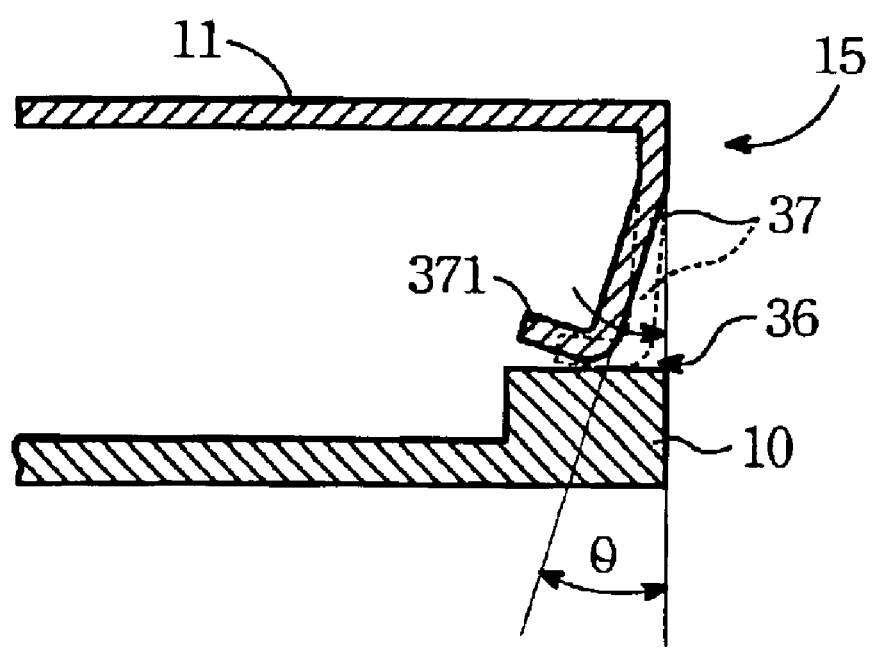
FIG. 5 is a fragmentary schematic view of another embodiment of a stopper structure of the present invention.

Referring now to FIG. 5 for another embodiment of the stopper structure 37 of the present invention, the end of stopper structure 37 which is inclined inwards for a predetermined angle is extended inwards for a selected length so as to form a jutting flange 371. The flange 371 is constructed away from the lower hosing 10.

Comparing the second embodiment in FIG. 5 with the embodiment shown in FIG. 3, the flange 371 allows the predetermined inward angle θ of the stopper 37 to be made smaller, or even becomes an obtuse angle (applicable as long as the pseudo line connecting the end of the flange 371 and the lateral side of the upper cover 11 can form an acute angle). However, taking into account of the upward lifting effect while being hit by the disk 14, the predetermined inward angle θ is still preferably ranged between 5 and 30 degrees.

By means of the constructions set forth above, the stopper structure of the present invention has a lateral side on the upper cover with an inward-angle tip or an inward flange extending from one end of the lateral side, and can effectively prevent the disk from slipping out through the aperture of the rotation disk housing during operations.

While the embodiments set forth above have taken the rotation disc housing of disk drives as examples, the present invention can be adopted equally well for wafer supporting devices (with the wafer acting as the disk), or other similar cover-type rotation support devices (for supporting disk-type articles).

While the present invention has been particularly shown and described with reference to a preferred embodiment, it will be understood by those skilled in the art that various changes in form and detail may be without departing from the spirit and scope of the present invention.

I claim:

1. A stopper structure for a rotation disc housing, comprising:
    a base tray for supporting a disk; and
    an upper cover forming an aperture with the base tray to allow the disk to move in or out of the rotation disc housing, and having a lateral side adjacent to the aperture for forming the stopper structure to prevent the disk from slipping out through the aperture from the rotation disc housing;
    wherein the lateral side is extended inwards by a predetermined inward angle for splitting and distributing impact force resulting from the disk slipping in a sideward direction and hitting the lateral side thereby to restrict the disk in the rotation disc housing.

2. The stopper structure for a rotation disc housing of claim 1, wherein said predetermined inward angle is ranged between 5 and 30 degrees.

3. The stopper structure for a rotation disc housing of claim 1, wherein said lateral side further include an end extended inwards for a selected length to form a flange directing away from the base tray.

* * * * *